US012149184B1

(12) United States Patent
Zhang et al.

(10) Patent No.: US 12,149,184 B1
(45) Date of Patent: Nov. 19, 2024

(54) MULTI-MODE CONTROL METHOD FOR GRID-CONNECTED INVERTER

(71) Applicant: HEFEI UNIVERSITY OF TECHNOLOGY, Hefei (CN)

(72) Inventors: Xing Zhang, Hefei (CN); Feng Han, Hefei (CN); Xiangdui Zhan, Hefei (CN); Yu Xiao, Hefei (CN); Xinxin Fu, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 18/754,219

(22) Filed: Jun. 26, 2024

(30) Foreign Application Priority Data

Nov. 17, 2023 (CN) .......................... 202311534477.3

(51) Int. Cl.
*H02M 7/5387* (2007.01)
*H02J 3/18* (2006.01)
(Continued)

(52) U.S. Cl.
CPC ....... *H02M 7/53871* (2013.01); *H02J 3/1807* (2013.01); *H02J 3/381* (2013.01); *H02M 7/5395* (2013.01)

(58) Field of Classification Search
CPC ............. H02M 7/53871; H02M 7/5395; H02J 3/1807; H02J 3/381
See application file for complete search history.

(56) References Cited

U.S. PATENT DOCUMENTS 5,465,203 A * 11/1995 Bhattacharya ............ H02J 3/01
363/40
6,366,483 B1 * 4/2002 Ma ...................... H02M 1/4216
363/41

(Continued)

OTHER PUBLICATIONS

Ming Li, et al., Impedance Adaptive Dual-Mode Control of Grid-Connected Inverters With Large Fluctuation of SCR and Its Stability Analysis Based on D-Partition Method, IEEE Transactions Transactions on Power Electronics, 2021, pp. 14420-14435, vol. 36 No. 12.

(Continued)

*Primary Examiner* — Yusef A Ahmed
(74) *Attorney, Agent, or Firm* — Bayramoglu Law Offices LLC

(57) ABSTRACT

A multi-mode control method for a grid-connected inverter includes: continuously calculating an effective value $V_{HarRms}$ of a voltage harmonic of a filtering capacitor; perturbing a control parameter to excite the voltage harmonic of the filtering capacitor; estimating a grid condition based on the perturbed control parameter and the effective value $V_{HarRms}$ of the voltage harmonic of the filtering capacitor; and switching a control mode of the grid-connected inverter based on the estimated grid condition. The multi-mode control method provides a grid condition detection method, which excites the voltage harmonic by perturbing the control parameter and determines the grid condition by the relationship between the control parameter and the effective value of the voltage harmonic. The multi-mode control method eliminates the need for additional grid impedance measurement equipment, and adapts to complex grid conditions with significant changes in the system short-circuit ratio (SCR) and the system series compensation degree.

5 Claims, 4 Drawing Sheets

Three-phase full-bridge inverter circuit

(51) Int. Cl.
*H02J 3/38* (2006.01)
*H02M 7/5395* (2006.01)

(56) References Cited

U.S. PATENT DOCUMENTS

| | | | | |
|---|---|---|---|---|
| 7,372,174 | B2* | 5/2008 | Jones | H02P 9/102 290/43 |
| 8,982,592 | B2* | 3/2015 | Tan | G05F 1/67 363/95 |
| 11,962,150 | B1* | 4/2024 | Bi | H02J 3/0012 |
| 12,009,659 | B1* | 6/2024 | Bi | H02J 3/001 |
| 2012/0063179 | A1* | 3/2012 | Gong | H02M 1/12 363/40 |
| 2013/0033907 | A1* | 2/2013 | Zhou | H02J 3/01 363/37 |
| 2013/0070505 | A1* | 3/2013 | Gritter | H02M 7/53875 363/140 |
| 2013/0279214 | A1* | 10/2013 | Takase | H02M 7/68 363/37 |
| 2013/0329471 | A1* | 12/2013 | Escobar | H02M 7/487 363/40 |
| 2014/0268957 | A1* | 9/2014 | Khajehoddin | H02J 3/1842 363/95 |
| 2017/0047862 | A1* | 2/2017 | Luo | H02M 7/53871 |
| 2017/0269168 | A1* | 9/2017 | Lung | H02J 3/381 |
| 2018/0006580 | A1* | 1/2018 | Lung | H02M 5/04 |
| 2018/0358907 | A1* | 12/2018 | Kato | H02M 7/53875 |
| 2019/0190274 | A1* | 6/2019 | Fazeli | H02J 7/35 |
| 2019/0312425 | A1* | 10/2019 | Xiao | H02H 7/12 |
| 2021/0083679 | A1* | 3/2021 | Yang | H03L 7/07 |
| 2021/0305890 | A1* | 9/2021 | Karimi | H02M 1/14 |
| 2022/0214386 | A1* | 7/2022 | Kim | H03L 7/085 |
| 2022/0320865 | A1* | 10/2022 | Zhang | G05B 19/042 |
| 2022/0352726 | A1* | 11/2022 | Zhang | H02J 3/48 |
| 2023/0387686 | A1* | 11/2023 | Liu | H02J 3/381 |
| 2024/0047969 | A1* | 2/2024 | Chen | H02J 3/388 |
| 2024/0055975 | A1* | 2/2024 | Inoue | H02J 3/381 |

OTHER PUBLICATIONS

Gao Benfeng, et al., Research on Subsynchronous Control Interaction Mitigation Strategy Based on Active Disturbance Rejection Control for Doubly-fed Induction Generator, Power System Technology, 2019, pp. 655-663, vol. 43 No.2.

Xu Fei, et al., Resonant Feedforward Control Strategy for LCL-type Grid-connected Inverters in Weak Grid Condition, Proceedings of the CSEE, 2016, pp. 4970-4979, vol. 36 No. 18.

Zhou Shiying, et al., Design of LCL-type Grid-connected Converter Current Loop Controller Parameters Considering Effects of Phase Locked Loops, Proceedings of the CSEE, 2016, pp. 1075-1089, vol. 36 No.4.

* cited by examiner

MULTI-MODE CONTROL METHOD FOR GRID-CONNECTED INVERTER

CROSS REFERENCE TO THE RELATED APPLICATIONS

This application is based upon and claims priority to Chinese Patent Application No. 202311534477.3, filed on Nov. 17, 2023, the entire contents of which are incorporated herein by reference.

TECHNICAL FIELD

The present disclosure belongs to the technical field of grid-connected inverter control for new energy generation, and in particular relates to a multi-mode control method for a grid-connected inverter.

BACKGROUND

The current control mode grid-connected inverter has been widely used due to its high power generation efficiency and high grid-connected power quality. However, due to the randomness and volatility of new energy sources, the output power of the current control mode grid-connected inverter constantly changes, causing the equivalent grid impedance to constantly change. This results in a weak grid condition with the short circuit ratio (SCR) fluctuating significantly. In recent years, the complex dynamic interaction between the current control mode grid-connected inverter and the weak grid impedance has caused a series of resonance and instability problems. The voltage control mode grid-connected inverter can simulate the external characteristics of the synchronous generator to provide beneficial support for the power grid, effectively improving the stability margin of a grid-connected system in a weak grid condition. However, the voltage control mode grid-connected inverter cannot ensure high stability margin in a strong grid condition, posing a risk of instability.

In order to compensate for the terminal voltage drop caused by the equivalent grid impedance and improve the long-distance new energy transmission capacity, a certain series compensation device can be connected to the transmission line. The series compensation device is mainly capacitive, making a significant impact on the low-frequency range of the equivalent grid impedance, further increasing the uncertainty of the grid impedance and causing new instability problems such as sub-synchronous oscillation. These complex grid conditions pose great challenges to the stable and efficient operation of new energy generation systems. Neither of the voltage control mode and current control mode grid-connected inverters can achieve stable operation over a wide range when the grid impedance changes significantly.

There are some academic literatures on the stability of grid-connected inverters in complex grid conditions.

1) The literature "Parameter Design for Current Loop Controller of LCL-type Grid-connected Inverter Considering the Influence of Phase-locked Loop" (2016. Proceedings of the CSEE. 33 (6): 54-60) proposes a solution to enhance the stability of the grid-connected inverter by reducing the bandwidth of the phase-locked loop. However, this solution will affect the dynamic performance of grid-connected control and cannot achieve grid stability in case of large grid impedance.

2) The literature "Resonant Feedforward Control Strategy for LCL-type Grid-connected Inverter in Weak Grid Conditions" (2016. Proceedings of the CSEE. 36 (18): 4970-4979) proposes a grid voltage feedforward solution that adds a bandpass filter on the feedforward channel. This solution enhances the stability margin of the system to a certain extent, but it cannot completely eliminate the impact of feedforward control on the stability of the grid-connected system in weak grid conditions, thereby failing to ensure the stability in extremely weak grid conditions.

3) The literature "Impedance Adaptive Dual-Mode Control of Grid-Connected Inverters with Large Fluctuation of SCR and Its Stability Analysis Based on D-Partition Method" (2021. 36:14420-14435) proposes an impedance adaptive dual-mode control strategy, including a voltage control mode in weak grid conditions and a current control mode in strong grid conditions. The impedance adaptive dual-mode control strategy achieves stable operation of the grid-connected inverter when the SCR changes. However, the dual-mode control strategy only considers the resistive and inductive grid conditions and neglects stability in series compensation grid conditions.

4) The literature "Research on Sub-synchronous Control Interaction Suppression Strategy for Double-fed Fans Based on Active-disturbance-rejection Control" (2019. Power System Technology. 43 (2): 332-341) proposes a solution to suppress sub-synchronous oscillations caused by the series compensation device by adding damping in the control loop. However, this solution cannot achieve stable operation when the SCR changes.

Based on the above literatures, there are the following shortcomings in the prior art.

1. The grid conditions are complex and changeable, and the existing research lacks detection on complex grid conditions.

2. Neither of the current control mode, the voltage control mode, and dual-mode switching control can achieve stable operation in complex and changeable grid conditions.

SUMMARY

A technical problem to be solved by the present disclosure is that the existing control solutions for grid-connected inverters do not adapt to the complex and changeable grid conditions, which poses a threat to grid-connected stability. For this purpose, the present disclosure proposes a multi-mode control method for a grid-connected inverter. The control method includes control parameter perturbation, grid condition estimation, grid-connected inverter control mode switching, etc., ultimately achieving adaptive stable control of the grid-connected inverter in case of changes in a short circuit ratio (SCR) and a series compensation degree of the system.

The objective of the present disclosure is achieved as follow. The present disclosure provides a multi-mode control method for a grid-connected inverter, where a topology of a grid-connected inverter using the method includes a direct current (DC) side power supply, a three-phase full-bridge inverter circuit, an LC filter, a grid impedor, and a three-phase power grid; the three-phase full-bridge inverter circuit, the LC filter, and the grid impedor are sequentially connected in series and then connected to the three-phase power grid; and the LC filter includes a filtering inductor, a filtering capacitor, and a damping resistor; and the control method specifically includes the following steps:

step 1, sampling three-phase voltages $u_{pcca}$, $u_{pccb}$, and $u_{pccc}$ of the filtering capacitor and three-phase currents $i_{ga}$, $i_{gb}$, and $i_{gc}$ of the filtering inductor;

step 2, allowing the grid-connected inverter to operate in an added-damping-free current control mode;

step 3, continuously calculating an effective value $V_{HarRms1}$ of a series compensation voltage harmonic of the filtering capacitor and an effective value $V_{HarRms2}$ of a weak grid voltage harmonic of the filtering capacitor;

step 4, initiating a system short-circuit ratio (SCR) estimation method as follows:

step 4.1, defining a switching boundary of a system SCR as $S_m$, and defining a limit for the effective value of the weak grid voltage harmonic of the filtering capacitor as $V_{Limit2}$; defining a proportional coefficient of a current control proportional-integral (PI) controller in the added-damping-free current control mode as $k_{p\_cc}$; and defining a switching boundary of the proportional coefficient of the current control PI controller in the added-damping-free current control mode as $k_{p\_cc\_m}$, where specifically, the proportional coefficient of the current control PI controller refers to a proportional coefficient that makes $V_{HarRms2}=V_{Limit2}$ when the system SCR=$S_m$;

step 4.2, defining an initial value of $k_{p\_cc}$ as $k_{p\_cc\_0}$, and continuously increasing $k_{p\_cc}$ to excite the voltage harmonic of the filtering capacitor; and stopping increasing $k_{p\_cc}$ when $V_{HarRms2}=V_{Limit2}$, and recording $k_{p\_cc}$ as a measured value $k_{p\_cc\_n}$ of the proportional coefficient of the current control PI controller in the added-damping-free current control mode;

step 4.3, determining that:
a current system SCR<$S_m$ when $k_{p\_cc\_n}$<$k_{p\_cc\_m}$;
the current system SCR=$S_m$ when $k_{p\_cc\_n}$=$k_{p\_cc\_m}$; and
the current system SCR>$S_m$ when $k_{p\_cc\_n}$>$k_{p\_cc\_m}$; and step 4.4, restoring the proportional coefficient $k_{p\_cc}$ of the current control PI controller in the added-damping-free current control mode to the initial value $k_{p\_cc\_0}$;

step 5, defining a system series compensation degree as $K_c$, and initiating a system series compensation degree $K_c$ estimation method as follows:

step 5.1, defining a switching boundary of the system series compensation degree as $C_m$; defining a limit for the effective value of the series compensation voltage harmonic of the filtering capacitor as $V_{Limit1}$, and defining a bandwidth of a phase-locked loop in the added-damping-free current control mode as $f_{bw\_PLL}$; and defining a switching boundary of the bandwidth of the phase-locked loop in the added-damping-free current control mode as $f_{bw\_PLL\_m}$, where specifically, the bandwidth of the phase-locked loop refers to a bandwidth that makes $V_{HarRms1}=V_{Limit1}$ when the system series compensation degree $K_c$=$C_m$;

step 5.2, defining an initial value of $f_{bw\_PLL}$ as $f_{bw\_PLL\_0}$, and continuously increasing $f_{bw\_PLL}$ to excite the voltage harmonic of the filtering capacitor; and stopping increasing $f_{bw\_PLL}$, when $V_{HarRms1}=V_{Limit1}$, and recording $f_{bw\_PLL}$, as a measured value $f_{bw\_PLL\_n}$ of the bandwidth of the phase-locked loop in the added-damping-free current control mode;

step 5.3, determining that:
a current system series compensation degree $K_c$>$C_m$ when $f_{bw\_PLL\_n}$<$f_{bw\_PL\_m}$;
the current system series compensation degree $K_c$=$C_m$ when $f_{bw\_PLL\_n}$=$f_{bw\_PLL\_m}$; and
the current system series compensation degree $K_c$<$C_m$ when $f_{bw\_PLL\_n}$>$f_{bw\_PLL\_m}$; and step 5.4, restoring the bandwidth $f_{bw\_PLL}$ of the phase-locked loop in the added-damping-free current control mode to the initial value $f_{bw\_PLL\_0}$;

step 6, performing the following operations based on the system SCR:
if SCR≤$S_m$: switching the grid-connected inverter to a voltage control mode, and ending a present control process; and
if SCR>$S_m$: proceeding to step 7; and step 7, performing the following operations based on the system series compensation degree $K_c$:
if $K_c$>$C_m$: switching the grid-connected inverter to an added-damping-based current control mode, and ending the present control process; and
if $K_c$≤$C_m$: maintaining the grid-connected inverter to operate in the added-damping-free current control mode, and ending the present control process.

Preferably, in the step 2, the added-damping-free current control mode is implemented as follows:

step 2.1, performing, based on the three-phase voltages $u_{pcca}$, $u_{pccb}$, and $u_{pccc}$ of the filtering capacitor sampled in the step 1, a transformation from a three-phase static coordinate system to a two-phase rotating coordinate system to acquire d- and q-axis voltages $u_{pccd1}$ and $u_{pccq1}$ of the filtering capacitor in the added-damping-free current control mode; and performing, by the phase-locked loop, phase locking on $u_{pccq1}$ to acquire a voltage phase angle $\theta_{PLL}$ of the filtering capacitor in the added-damping-free current control mode according to the following phase-locked calculation equation:

$$\theta_{PLL} = \frac{\omega_n - (k_{p\_PLL} + k_{i\_PLL}/s)u_{pccq1}}{s}$$

where $\omega_n$ denotes a rated angular frequency of a system, $k_{p\_PLL}$ denotes a proportional control coefficient of a phase-locked loop PI controller in the added-damping-free current control mode, and $k_{i\_PLL}$ denotes an integral control coefficient of the phase-locked loop PI controller in the added-damping-free current control mode;

step 2.2, transforming, based on the voltage phase angle $\theta_{PLL}$ of the filtering capacitor in the added-damping-free current control mode acquired in the step 2.1, the three-phase currents $i_{ga}$, $i_{gb}$, and $i_{gc}$ of the filtering inductor into d- and q-axis currents $i_{gd1}$ and $i_{gq1}$ of the filtering inductor in the added-damping-free current control mode according to a transformation equation from the three-phase static coordinate system to the two-phase rotating coordinate system;

step 2.3, defining current command signals in the added-damping-free current control mode as $i_{dref1}$ and $i_{qref1}$; and acquiring, based on the d- and q-axis currents $i_{gd1}$ and $i_{gq1}$ of the filtering inductor in the added-damping-free current control mode acquired in the step 2.2, d- and q-axis control signals $u_{d1}$ and $u_{q1}$ in the added-damping-free current control mode according to current closed-loop control equations in the added-damping-free current control mode;

where the current closed-loop control equations in the added-damping-free current control mode are as follows:

$$u_{d1} = \left(k_{p\_cc} + \frac{k_{i\_cc}}{s}\right)(i_{dref1} - i_{gd1})$$

-continued $$u_{q1} = \left(k_{p\_cc} + \frac{k_{i\_cc}}{s}\right)(i_{qref1} - i_{gq1})$$

where $k_{p\_cc}$ denotes the proportional coefficient of the current control PI controller in the added-damping-free current control mode, and $k_{i\_cc}$ denotes an integral coefficient of the current control PI controller in the added-damping-free current control mode;

step 2.4, performing, based on the voltage phase angle $\theta_{PLL}$ of the filtering capacitor in the added-damping-free current control mode acquired in the step 2.1 and the d- and q-axis control signals $u_{d1}$ and $u_{q1}$ in the added-damping-free current control mode acquired in the step 2.3, a transformation from the two-phase rotating coordinate system to the three-phase static coordinate system to acquire three-phase control signals $u_{a1}$, $u_{b1}$, and $u_{c1}$ in the added-damping-free current control mode in the static coordinate system; and step 2.5, performing, based on the three-phase control signals $u_{a1}$, $u_{b1}$, and $u_{c1}$ in the added-damping-free current control mode in the static coordinate system acquired in the step 2.4, a space vector pulse width modulation (SVPWM) to generate a switch signal for a power device of the grid-connected inverter; and controlling, by a driving protection circuit, the power device of the three-phase full-bridge grid-connected inverter to be turned on and off.

Preferably, step 3 includes: presetting a harmonic effective value calculation interval $T_{onecycle}$, starting a round of harmonic effective value calculation when the harmonic effective value calculation interval $T_{onecycle}$ is reached, and calculating the effective value $V_{HarRms1}$ of the series compensation voltage harmonic of the filtering capacitor and the effective value of the weak grid voltage harmonic of the filtering capacitor;

step 3.1, processing, by a low-pass filter GI(s) and a bandpass filter $G_B(s)$, an A-phase voltage $u_{pcca}$ of the filtering capacitor to acquire an A-phase low-pass voltage $u_{pcca\_L}$ and an A-phase bandpass voltage $u_{pcca\_B}$ of the filtering capacitor;

where the A-phase voltage of the filtering capacitor is processed by the low-pass filter GI(s) and the bandpass filter $G_B(s)$ according to the following equations:

$$u_{pcca\_L} = G_L(s)u_{pcca} = \frac{1}{T_{filter}s}u_{pcca}$$

$$u_{pcca\_B} = G_B(s)u_{pcca} = \left(\frac{\omega_{B2}}{s+\omega_{B2}} - \frac{\omega_{B1}}{s+\omega_{B1}}\right)u_{pcca}$$

where $T_{filter}$ denotes a time constant of the low-pass filter, $\omega_2$ denotes a right frequency point of the bandpass filter, $\omega_{B1}$ denotes a left frequency point of the bandpass filter, and s denotes a Laplace operator;

step 3.2, defining a sampling period of the grid-connected inverter as Ts, continuously recording the A-phase low-pass voltage $u_{pcca\_L}$, and the A-phase bandpass voltage $u_{pcca\_B}$ of the filtering capacitor acquired in the step 3.1 during each sampling period, defining a number of records within the harmonic effective value calculation interval $T_{onecycle}$ as N, $N=T_{onecycle}/T_s$, and defining the A-phase low-pass voltage $u_{pcca\_L}$ and the A-phase bandpass voltage $u_{pcca\_B}$ of the filtering capacitor at an i-th record as $u_{pcca\_L}(i)$ and $u_{pcca\_B}(i)$, respectively, where i=1, 2, 3 .... N; and step 3.3, calculating, based on the A-phase low-pass voltage and the A-phase bandpass voltage of the filtering capacitor recorded in the step 3.2, the effective value $V_{HarRms1}$ of the series compensation voltage harmonic of the filtering capacitor and the effective value $V_{HarRms2}$ of the weak grid voltage harmonic of the filtering capacitor as follows:

$$V_{HarRms1} = \sqrt{\frac{1}{N}\sum_{i=1}^{N}\{[u_{pcca\_L}(i)]^2\}}$$

$$V_{HarRms2} = \sqrt{\frac{1}{N}\sum_{i=1}^{N}\{[u_{pcca\_B}(i)]^2\}}.$$

Preferably, in the step 6, the voltage control mode includes:

step 6.1, acquiring, based on the three-phase voltages $u_{pcca}$, $u_{pccb}$, and $u_{pccc}$ of the filtering capacitor sampled in the step 1, α- and β-axis voltages $u_{pcc\alpha}$ and $u_{pcc\beta}$ of the filtering capacitor according to a transformation equation from a three-phase static coordinate system to a two-phase static coordinate system; and acquiring, based on the three-phase currents $i_{ga}$, $i_{gb}$, and $i_{gc}$ of the filtering inductor sampled in the step 1, α- and β-axis currents $i_{g\alpha}$ and $i_{g\beta}$ of the filtering inductor according to the transformation equation from the three-phase static coordinate system to the two-phase static coordinate system;

step 6.2, acquiring, based on the α- and β-axis voltages $u_{pcc\alpha}$ and $u_{pcc\beta}$ of the filtering capacitor and the α- and β-axis currents $i_{g\alpha}$ and $i_{g\beta}$ of the filtering inductor acquired in the step 6.1, an instantaneous active power $P_e$ and an instantaneous reactive power $Q_e$ according to instantaneous power calculation equations;

where the instantaneous power calculation equations are as follows:

$$P_e = 1.5(u_{pcc\alpha}i_{g\alpha} + u_{pcc\beta}i_{g\beta})$$

$$Q_e = 1.5(u_{pcc\alpha}i_{g\beta} - u_{pcc\beta}i_{g\alpha})$$

step 6.3, acquiring, based on the instantaneous active power $P_e$ acquired in the step 6.2, a voltage control mode output angular frequency $\omega_v$, according to an active-frequency droop control equation; and acquiring, based on the voltage control mode output angular frequency $\omega_v$, a voltage source mode output angle θ, $\theta\omega_v/s$, s being a Laplace operator;

where the active-frequency droop control equation is as follows:

$$\omega_v = \omega_n + m(P_{set} - P_e)$$

where $P_{set}$ denotes an active command signal, m denotes an active-frequency droop coefficient, and on denotes a rated angular frequency of a system;

step 6.4, performing, based on the voltage control mode output phase angle θ acquired in the step 6.3 and the three-phase voltages $u_{pcca}$, $u_{pccb}$, and $u_{pccc}$ of the filtering capacitor and the three-phase currents $i_{ga}$, $i_{gb}$, and $i_{gc}$ of the filtering inductor acquired in the step 1, a transformation from the three-phase static coordinate system to a two-phase rotating coordinate system to acquire d- and q-axis voltages $u_{pccd2}$ and $u_{pccq2}$ of the filtering capacitor in the voltage control mode and d- and q-axis currents $i_{gd2}$ and $i_{gq2}$ of the filtering inductor in the voltage control mode;

step 6.5, acquiring, based on the instantaneous reactive power $Q_e$ acquired in the step 6.2, voltage command signals $u_{dref}$ and $u_{qref}$ in the voltage control mode according to reactive-voltage droop control equations; where the reactive-voltage droop control equations are as follows:

$$u_{dref}=\sqrt{2}V_n+n(Q_{set}-Q_e)$$

$$u_{qref}=0$$

where $V_n$ denotes an effective value of a grid phase voltage, $Q_{set}$ denotes a reactive command signal, and n denotes a reactive-voltage droop coefficient;

step 6.6, acquiring, based on the d- and q-axis currents $i_{gd2}$ and $i_{gq2}$ of the filtering inductor in the voltage control mode and the d- and q-axis voltages $u_{pccd2}$ and $u_{pccq2}$ of the filtering capacitor in the voltage control mode acquired in the step 6.4 and the voltage command signals $u_{dref}$ and $u_{qref}$ in the voltage control mode acquired in the step 6.5, d- and q-axis control signals $u_{d2}$ and $u_{q2}$ in a voltage source mode according to voltage-current closed-loop control equations; where the voltage-current closed-loop control equations are as follows:

$$u_{d2} = \left(k_{p\_cc\_v} + \frac{k_{i\_cc\_v}}{s}\right)\left[\left(k_{p\_vc} + \frac{k_{i\_vc}}{s}\right)(u_{dref} - u_{pccd2}) - i_{gd2}\right]$$

$$u_{q2} = \left(k_{p\_cc\_v} + \frac{k_{i\_cc\_v}}{s}\right)\left[\left(k_{p\_vc} + \frac{k_{i\_vc}}{s}\right)(u_{qref} - u_{pccq2}) - i_{gq2}\right]$$

where $k_{p\_cc\_v}$ denotes a proportional coefficient of the current control PI controller in the voltage control mode, $k_{i\_cc\_v}$ denotes an integral coefficient of the current control PI controller in the voltage control mode, $k_{p\_vc}$ denotes a proportional coefficient of a voltage control PI controller in the voltage control mode, and $k_{i\_vc}$ denotes an integral coefficient of the voltage control PI controller in the voltage control mode;

step 6.7, performing, based on the voltage source mode output angle θ acquired in the step 6.3 and the voltage source mode d- and q-axis control signals $u_{d2}$ and $u_{q2}$ acquired in the step 6.6, a transformation from the two-phase rotating coordinate system to the three-phase static coordinate system to acquire three-phase control signals $u_{a2}$, $u_{b2}$, and $u_{c2}$ in the voltage source mode in the static coordinate system; and step 6.8, performing, based on the three-phase control signals $u_{a2}$, $u_{b2}$, and $u_{c2}$ in the voltage source mode in the static coordinate system acquired in the step 6.7, a SVPWM to generate a switch signal for a power device of the grid-connected inverter; and controlling, by a driving protection circuit, the power device of the three-phase full-bridge grid-connected inverter to be turned on and off.

Preferably, in the step 7, the added-damping-based current control mode includes:

step 7.1, acquiring, based on the three-phase voltages $u_{pcca}$, $u_{pccb}$, and $u_{pccc}$ of the filtering capacitor sampled in the step 1, d- and q-axis voltages $u_{pccd3}$ and $u_{pccq3}$ of the filtering capacitor in the added-damping-based current control mode according to a transformation equation from a three-phase static coordinate system to a two-phase rotating coordinate system; and performing, by the phase-locked loop, phase locking on $u_{pccq3}$ to acquire a voltage phase angle $\theta_{PLL\_R}$ of the filtering capacitor in the added-damping-based current control mode;

where a phase-locked calculation equation for the voltage phase angle $\theta_{PLL\_R}$ of the filtering capacitor in the added-damping-based current control mode is as follows:

$$\theta_{PLL\_R} = \frac{\omega_n - (k_{p\_PLL\_R} + k_{i\_PLL\_R}/s)u_{pccq3}}{s}$$

where $\omega_n$ denotes a rated angular frequency of a system, $k_{p\_PLL\_R}$ denotes a proportional control coefficient of a phase-locked loop PI controller in the added-damping-based current control mode, $k_{i\_PLL\_R}$ denotes an integral control coefficient of the phase-locked loop PI controller in the added-damping-based current control mode, and $\omega_n$ denotes the rated angular frequency of the system;

step 7.2, performing, based on the voltage phase angle $\theta_{PLL\_R}$ of the filtering capacitor in the added-damping-based current control mode acquired in the step 7.1, a transformation from the three-phase static coordinate system to the two-phase rotating coordinate system to transform the three-phase currents $i_{ga}$, $i_{gb}$, and $i_{gc}$ of the filtering inductor into d- and q-axis currents $i_{gd3}$ and $i_{gq3}$ of the filtering inductor in the added-damping-based current control mode;

step 7.3, calculating, based on the d- and q-axis voltages $u_{pccd3}$ and $u_{pccq3}$ of the filtering capacitor in the added-damping-based current control mode acquired in the step 7.1, added-damping-based d- and q-axis current command correction signals $\Delta i_{dref}$ and $\Delta i_{qref}$ as follows:

$$\Delta i_{dref}=G_{BPF}(s)R_v u_{pccd3}$$

$$\Delta i_{qref}=G_{BPF}(s)R_v u_{pccq3}$$

where $R_v$ denotes an added-damping-based resistance value; and $G_{BPF}(s)$ denotes a bandpass filter and is specifically expressed as follows:

$$G_{BPF}(s) = \frac{\omega_{c2}}{S+\omega_{c2}} - \frac{\omega_{c1}}{s+\omega_{c1}}$$

where $\omega_{c1}$ denotes a left frequency point of a passband of the bandpass filter $G_{BPF}(s)$, and $\omega_{c2}$ denotes a right frequency point of the passband of the bandpass filter $G_{BPF}(s)$;

step 7.4, defining current command signals in the added-damping-based current control mode as $i_{dref3}$ and $i_{qref3}$; and acquiring, based on the d- and q-axis currents $i_{gd3}$ and $i_{gq3}$ of the filtering inductor in the added-damping-based current control mode acquired in the step 7.2 and the added-damping-based d- and q-axis current command correction signals $\Delta i_{dref}$ and $\Delta i_{qref}$ acquired in the step 7.3, d- and q-axis control signals $u_{d3}$ and $u_{q3}$ in the added-damping-based current control mode according to current closed-loop control equations in the added-damping-based current control mode;

where the current closed-loop control equations in the added-damping-based current control mode are as follows:

$$u_{d2} = \left(k_{p\_cc\_R} + \frac{k_{i\_cc\_R}}{s}\right)(i_{dref3} - i_{gd3} - \Delta i_{dref})$$

$$u_{q3} = \left(k_{p\_cc\_R} + \frac{k_{i\_cc\_R}}{s}\right)(i_{qref3} - i_{gq3} - \Delta i_{qref})$$

where $k_{p\_cc\_R}$ denotes a proportional coefficient of the current control PI controller in the added-damping-based current control mode, and $k_{i\_cc\_R}$ denotes an integral coefficient of the current control PI controller in the added-damping-based current control mode;

step 7.5, performing, based on the voltage phase angle $\theta_{PLL\_R}$ of the filtering capacitor in the added-damping-based current control mode acquired in the step 7.1 and the d- and q-axis control signals $u_{d3}$ and $u_{q3}$ in the added-damping-based current control mode acquired in the step 7.4, a transformation from the two-phase rotating coordinate system to the three-phase static coordinate system to acquire three-phase control signals $u_{a3}$, $u_{b3}$, and $u_{c3}$ in the added-damping-based current control mode in the static coordinate system; and step 7.6, performing, based on the three-phase control signals $u_{a3}$, $u_{b3}$, and $u_{c3}$ in the added-damping-based current control mode in the static coordinate system acquired in the step 7.5, a SVPWM to generate a switch signal for a power device of the grid-connected inverter; and controlling, by a driving protection circuit, the power device of the three-phase full-bridge grid-connected inverter to be turned on and off.

Compared with the prior art, the present disclosure has the following beneficial effects:

1. The present disclosure provides a grid condition detection method, which excites the voltage harmonic by perturbing the control parameter and determines the grid condition by the relationship between the control parameter and the effective value of the voltage harmonic, without the need for additional grid impedance measurement equipment.

2. The present disclosure provides a multi-mode control method that adapts to complex grid conditions with significant changes in the system SCR and series compensation degree.

DETAILED DESCRIPTION OF THE EMBODIMENTS

The present disclosure is described in more detail according to the drawings.

Figure 1:
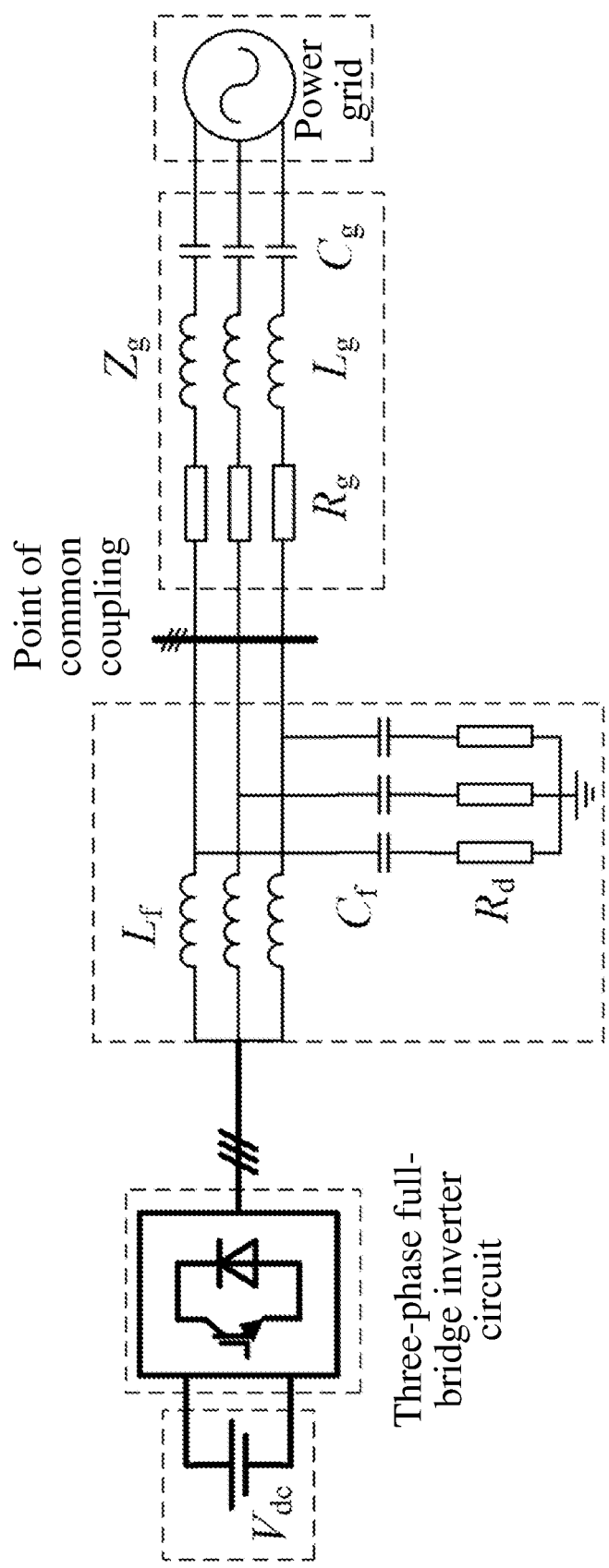
FIG. 1 shows a main circuit topology of a grid-connected inverter according to the present disclosure.

FIG. 1 shows a main circuit topology of a grid-connected inverter in the present disclosure. As shown in FIG. 1, the topology includes a direct current (DC) side power supply, a three-phase full-bridge inverter circuit, an LC filter, a grid impedor, and a three-phase power grid. The three-phase full-bridge inverter circuit, the LC filter, and the grid impedor are sequentially connected in series and then connected to the three-phase power grid. The LC filter includes a filtering inductor, a filtering capacitor, and a damping resistor.

In FIG. 1, $V_{dc}$ denotes a DC voltage of the DC side power supply, $Z_g$ denotes a grid impedor, $R_g$ denotes a resistive component of the grid impedor $Z_g$, and $L_g$ denotes an inductive component of the grid impedor $Z_g$. The LC filter includes filtering inductor $L_f$, filtering capacitor $C_f$, and damping resistor Rd. The three-phase full-bridge inverter circuit is connected in series between the DC side power supply and the filtering inductor $L_f$. The other end of the filtering inductor Lris connected to the grid impedor $Z_g$. The filtering capacitor Cr and the damping resistor Ra are connected in parallel between the filtering inductor $L_f$ and the grid impedor $Z_g$. The grid impedor $Z_g$ is connected to the three-phase power grid to achieve grid connection.

In this embodiment, the DC side voltage $V_{dc}$ is 770 V, an inductance value of the filtering inductor $L_f$ is 0.9 mH, a capacitance value of the filtering capacitor $C_f$ is 11.6 uF, a resistance value of the damping resistor Ra is 0.3, the resistive component $R_g$ of the grid impedor $Z_g$ is 0, the inductive components $L_g$ of the grid impedor $Z_g$ are 4.62 mH and 11.55 mH, and capacitive components $C_g$ of the grid impedor $Z_g$ are 0 mF and 3.67 mF.

Figure 2:
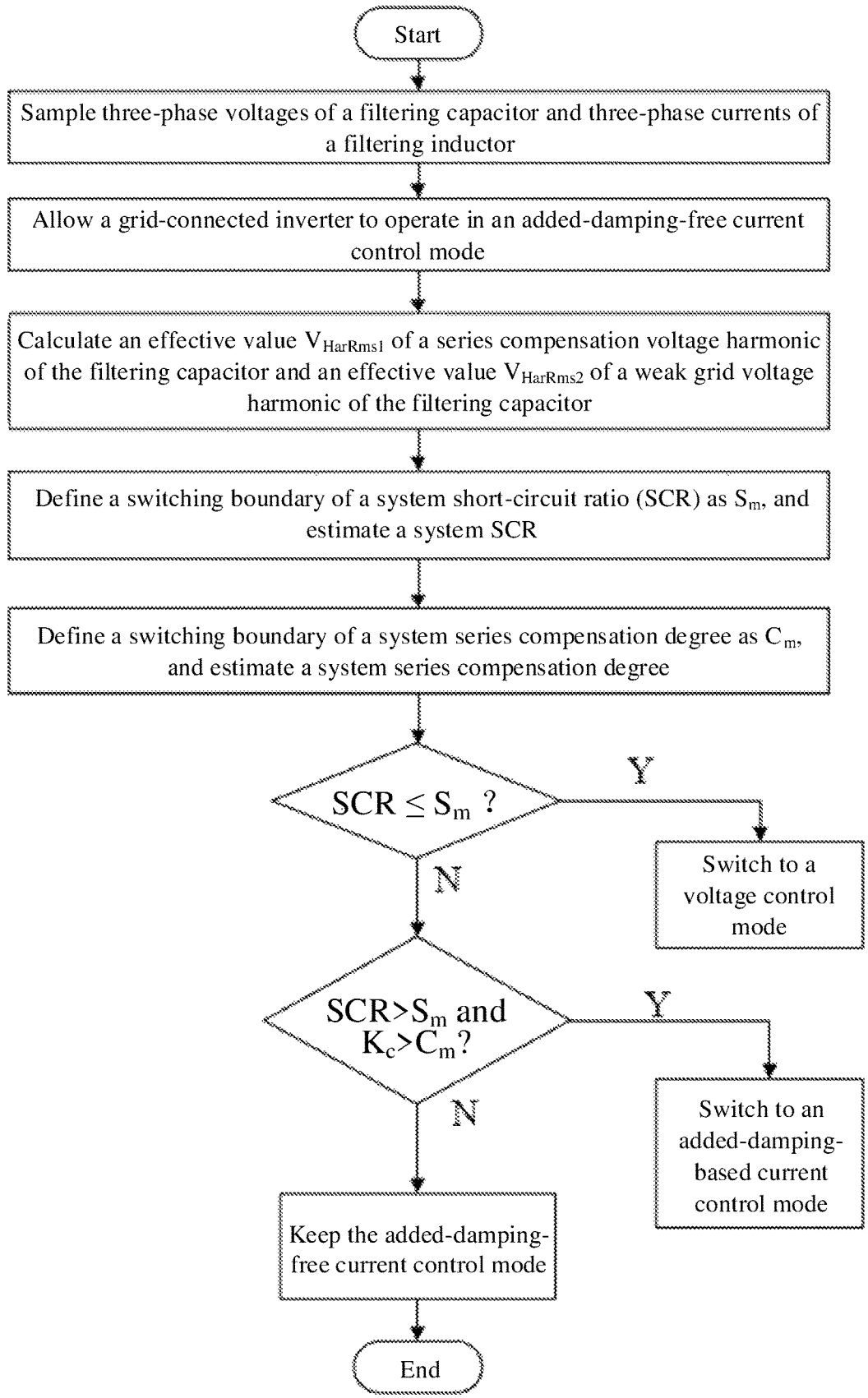
FIG. 2 is a multi-mode control flowchart of the grid-connected inverter according to the present disclosure.

FIG. 2 is a multi-mode control flowchart of the grid-connected inverter in the present disclosure. As shown in FIG. 2, the present disclosure provides a multi-mode control method for the grid-connected inverter.

Firstly, an effective value $V_{HarRms}$ of a voltage harmonic of the filtering capacitor is continuously calculated. Secondly, a control parameter is perturbed to excite the voltage harmonic of the filtering capacitor. Then, a grid condition is estimated based on the perturbed control parameter and the effective value $V_{HarRms}$ of the voltage harmonic of the filtering capacitor. Finally, a control mode of the grid-connected inverter is switched based on the estimated grid condition.

The control method specifically includes the following steps.

Step 1, three-phase voltages $u_{pcca}$, $u_{pccb}$, and $u_{pccc}$ of the filtering capacitor and three-phase currents $i_{ga}$, $i_{gb}$, and $i_{gc}$ of the filtering inductor are sampled.

Step 2, the grid-connected inverter is set to operate in an added-damping-free current control mode.

Step 3, effective value $V_{HarRms1}$ of a series compensation voltage harmonic of the filtering capacitor and effective value $V_{HarRms2}$ of a weak grid voltage harmonic of the filtering capacitor are continuously calculated.

Step 4, a system short-circuit ratio (SCR) estimation method is initiated is defined as follows.

Step 4.1, a switching boundary of a system SCR is defined as $S_m$, and a limit for the effective value of the weak grid voltage harmonic of the filtering capacitor is defined as $V_{Limit2}$. A proportional coefficient of a current control proportional-integral (PI) controller in the added-damping-free current control mode is defined as $k_{p\_cc}$. A switching boundary of the proportional coefficient of the current control PI controller in the added-damping-free current control mode is defined as $k_{p\_cc\_m}$, where specifically, the proportional coefficient of the current control PI controller refers to a proportional coefficient that makes $V_{HarRms2}=V_{Limit2}$ when the system SCR=$S_m$.

Step 4.2, an initial value of $k_{p\_cc}$ is defined as $k_{p\_cc\_0}$, and $k_{p\_cc}$ is continuously increased to excite the voltage harmonic of the filtering capacitor. The increasing of $k_{p\_cc}$ is stopped when $V_{HarRms2}=V_{Limit2}$, and $k_{p\_cc}$ is recorded as measured value $k_{p\_cc\_n}$ of the proportional coefficient of the current control PI controller in the added-damping-free current control mode.

Step 4.3, it is determine that:
a current system $SCR<S_m$ when $k_{p\_cc\_n}<k_{p\_cc\_m}$.
the current system $SCR=S_m$ when $k_{p\_cc\_n}=K_{p\_cc\_m}$.
the current system $SCR>S_m$ when $k_{p\_cc\_n}>k_{p\_cc\_m}$.

Step 4.4, the proportional coefficient $k_{p\_cc}$ of the current control PI controller in the added-damping-free current control mode is restored to the initial value $k_{p\_cc\_0}$.

In this embodiment, $S_m=2$, $V_{Limit2}=10$ V, $k_{p\_cc\_0}=4$, and $k_{p\_cc\_m}=10$.

Step 5, a system series compensation degree is defined as $K_c$, and a system series compensation degree $K_c$ estimation method is initiated as follows:

Step 5.1, a switching boundary of the system series compensation degree is defined as $C_m$. A limit for the effective value of the series compensation voltage harmonic of the filtering capacitor is defined as $V_{Limit1}$, and a bandwidth of a phase-locked loop in the added-damping-free current control mode is defined as $f_{bw\_PLL}$. A switching boundary of the bandwidth of the phase-locked loop in the added-damping-free current control mode is defined as $f_{bw\_PLL\_m}$, where specifically, the bandwidth of the phase-locked loop refers to a bandwidth that makes $V_{HarRms1}=V_{Limit1}$ when the system series compensation degree $K_c=C_m$.

Step 5.2, an initial value of $f_{bw\_PLL}$ is defined as $f_{bw\_PLL\_0}$, and $f_{bw\_PLL}$ is continuously increased to excite the voltage harmonic of the filtering capacitor. The increasing of $f_{bw\_PLL}$ is stopped when $V_{HarRms1}=V_{Limit1}$, and $f_{bw\_PLL}$ is recorded as measured value $f_{bw\_PLL\_n}$ of the bandwidth of the phase-locked loop in the added-damping-free current control mode.

Step 5.3, it is determined that:
a current system series compensation degree $K_c>C_m$ when $f_{bw\_PLL\_n}<f_{bw\_PLL\_m}$.
the current system series compensation degree $K_c=C_m$ when $f_{bw\_PLL\_n}=f_{bw\_PLL\_m}$.
the current system series compensation degree $K_c<C_m$ when $f_{bw\_PLL\_n}>f_{bw\_PL\_m}$.

Step 5.4, the bandwidth $f_{bw\_PLL}$ of the phase-locked loop in the added-damping-free current control mode is restored to the initial value $f_{bw\_PLL\_0}$.

In this embodiment, $C_m=0.6$, $V_{Limit1}=10$ V, $f_{bw\_PLL\_0}=20$ Hz, and $f_{bw\_PLL\_m}=100$ Hz.

Step 6, the following operations are performed based on the system SCR.

If $SCR\leq S_m$: the grid-connected inverter is switched to a voltage control mode, and a present control process is ended.

If $SCR>S_m$: the operation proceeds to Step 7.

Step 7, the following operations are performed based on the system series compensation degree $K_c$.

If $K_c>C_m$: the grid-connected inverter is switched to an added-damping-based current control mode, and ending the present control process.

If $K_c\leq C_m$: the grid-connected inverter is maintained to operate in the added-damping-free current control mode, and the present control process is ended.

In this embodiment, in the step 2, the added-damping-free current control mode is implemented as follows:

Step 2.1, based on the three-phase voltages $u_{pcca}$, $u_{pccb}$, and $u_{pccc}$ of the filtering capacitor sampled in the step 1, a transformation from a three-phase static coordinate system to a two-phase rotating coordinate system is performed to acquire d- and q-axis voltages $u_{pccd1}$ and $u_{pccq1}$ of the filtering capacitor in the added-damping-free current control mode. Phase locking is performed by the phase-locked loop on $u_{pccq1}$ to acquire voltage phase angle $\theta_{PLL}$ of the filtering capacitor in the added-damping-free current control mode according to the following phase-locked calculation equation:

$$\theta_{PLL} = \frac{\omega_n - (k_{p\_PLL} + k_{i\_PLL}/s)u_{pccq1}}{s}$$

where $\omega_n$ denotes a rated angular frequency of a system, $k_{p\_PLL}$ denotes a proportional control coefficient of a phase-locked loop PI controller in the added-damping-free current control mode, and $k_{i\_PLL}$ denotes an integral control coefficient of the phase-locked loop PI controller in the added-damping-free current control mode.

In this embodiment, $\omega_n=100\pi$, $K_{p\_PLL}=0.2776$, and $K_{i\_PLL}=11.9882$.

Step 2.2, based on the voltage phase angle $\theta_{PLL}$ of the filtering capacitor in the added-damping-free current control mode acquired in the step 2.1, the three-phase currents $i_{ga}$, $i_{gb}$, and $i_{gc}$ of the filtering inductor are transformed into d- and q-axis currents $i_{gd1}$ and $i_{gq1}$ of the filtering inductor in the added-damping-free current control mode according to a transformation equation from the three-phase static coordinate system to the two-phase rotating coordinate system.

Step 2.3, current command signals in the added-damping-free current control mode are defined as $i_{dref1}$ and $i_{qref1}$. Based on the d- and q-axis currents $i_{gd1}$ and $i_{gq1}$ of the filtering inductor in the added-damping-free current control mode acquired in the step 2.2, d- and q-axis control signals $u_{d1}$ and $u_{q1}$ in the added-damping-free current control mode are acquired according to current closed-loop control equations in the added-damping-free current control mode.

The current closed-loop control equations in the added-damping-free current control mode are is defined as follows:

$$u_{d1} = \left(k_{p\_cc} + \frac{k_{i\_cc}}{s}\right)(i_{dref1} - i_{gd1})$$

$$u_{q1} = \left(k_{p\_cc} + \frac{k_{i\_cc}}{s}\right)(i_{qref1} - i_{gq1})$$

where $k_{p\_cc}$ denotes the proportional coefficient of the current control PI controller in the added-damping-free current control mode, and $k_{i\_cc}$ denotes an integral coefficient of the current control PI controller in the added-damping-free current control mode.

In this embodiment, $i_{dref1}=42$ A, $i_{qref1}=0$ A, $k_{p\_cc}=4$, and $k_{i\_cc}=10$.

Step 2.4, based on the voltage phase angle $\theta_{PLL}$ of the filtering capacitor in the added-damping-free current control mode acquired in the step 2.1 and the d- and q-axis control signals $u_{d1}$ and $u_{q1}$ in the added-damping-free current control mode acquired in the step 2.3, a transformation from the two-phase rotating coordinate system to the three-phase static coordinate system is performed to acquire three-phase control signals $u_{a1}$, $u_{b1}$, and $u_{c1}$ in the added-damping-free current control mode in the static coordinate system.

Step 2.5, based on the three-phase control signals $u_{a1}$, $u_{b1}$, and $u_{c1}$ in the added-damping-free current control mode in the static coordinate system acquired in the step 2.4, a space vector pulse width modulation (SVPWM) is performed to generate a switch signal for a power device of the grid-connected inverter. The power device of the three-phase full-bridge grid-connected inverter is controlled by a driving protection circuit to be turned on and off.

In this embodiment, the Step 3 includes: presetting a harmonic effective value calculation interval $T_{onecycle}$, starting a round of harmonic effective value calculation when the harmonic effective value calculation interval $T_{onecycle}$ is reached, and calculating the effective value $V_{HarRms1}$ of the series compensation voltage harmonic of the filtering capacitor and the effective value $V_{HarRms2}$ of the weak grid voltage harmonic of the filtering capacitor.

Step 3.1, an A-phase voltage $u_{pcca}$ of the filtering capacitor is processed by a low-pass filter $G_B(s)$ and a bandpass filter $G_B(s)$ to acquire an A-phase low-pass voltage $u_{pcca\_L}$ and an A-phase bandpass voltage $u_{pcca\_B}$ of the filtering capacitor.

The A-phase voltage of the filtering capacitor is processed by the low-pass filter GI(s) and the bandpass filter $G_B(s)$ according to the following equations:

$$u_{pcca\_L} = G_L(s)u_{pcca} = \frac{1}{T_{filter}s}u_{pcca}$$

$$u_{pcca\_B} = G_B(s)u_{pcca} = \left(\frac{\omega_{B2}}{s+\omega_{B2}} - \frac{\omega_{B1}}{s+\omega_{B1}}\right)u_{pcca}$$

where $T_{filter}$ denotes a time constant of the low-pass filter, $\omega_{B2}$ denotes a right frequency point of the bandpass filter, $\omega_{B1}$ denotes a left frequency point of the bandpass filter, and s denotes a Laplace operator.

In this embodiment, $T_{filter}$=0.02 s, $\omega_{B2}$=2,000 π, and $\omega_{B2}$=400 π.

Step 3.2, a sampling period of the grid-connected inverter is defined as Ts, the A-phase low-pass voltage $u_{pcca\_L}$ and the A-phase bandpass voltage $u_{pcca\_B}$ of the filtering capacitor acquired in the step 3.1 are continuously recorded during each sampling period; a number of records within the harmonic effective value calculation interval $T_{onecycle}$ is defined as N, N=$T_{onecycle}/T_s$; and the A-phase low-pass voltage $u_{pcca\_L}$ and the A-phase bandpass voltage $u_{pcca\_B}$ of the filtering capacitor at an i-th record are defined as $u_{pcca\_L}$(i) and $u_{pcca\_B}$(i), respectively, where i=1, 2, 3 . . . . N.

In this embodiment, $T_s$=0.0625 ms, and N=16,000.

Step 3.3, based on the A-phase low-pass voltage and the A-phase bandpass voltage of the filtering capacitor recorded in the step 3.2, the effective value $V_{HarRms1}$ of the series compensation voltage harmonic of the filtering capacitor and the effective value $V_{HarRms2}$ of the weak grid voltage harmonic of the filtering capacitor are calculated as follows:

$$V_{HarRms1} = \sqrt{\frac{1}{N}\sum_{i=1}^{N}\{[u_{pcca\_L}(i)]^2\}}$$

$$V_{HarRms2} = \sqrt{\frac{1}{N}\sum_{i=1}^{N}\{[u_{pcca\_B}(i)]^2\}}.$$

In this embodiment, in the step 6, the voltage control mode includes:

Step 6.1, based on the three-phase voltages $u_{pcca}$, $u_{pccb}$, and $u_{pccc}$ of the filtering capacitor sampled in the step 1, α- and β-axis voltages $u_{pcca}$ and $u_{pccβ}$ of the filtering capacitor are acquired according to a transformation equation from a three-phase static coordinate system to a two-phase static coordinate system. Based on the three-phase currents $i_{ga}$, $i_{gb}$, and $i_{gc}$ of the filtering inductor sampled in the step 1, α- and β-axis currents $i_{gα}$ and $i_{gβ}$ of the filtering inductor are acquired according to the transformation equation from the three-phase static coordinate system to the two-phase static coordinate system.

Step 6.2, based on the α- and β-axis voltages $u_{pcca}$ and $u_{pccβ}$ of the filtering capacitor and the α- and β-axis currents $i_{gα}$ and $i_{gβ}$ of the filtering inductor acquired in the step 6.1, instantaneous active power $P_e$ and instantaneous reactive power $Q_e$ are acquired according to instantaneous power calculation equations.

The instantaneous power calculation equations are as follows:

$$P_e=1.5(u_{pccα}i_{gα}+u_{pccβ}i_{gβ})$$

$$Q_e=1.5(u_{pccα}i_{gβ}-u_{pccβ}i_{gα})$$

Step 6.3, based on the instantaneous active power $P_e$ acquired in the step 6.2, voltage control mode output angular frequency ω, is acquired according to an active-frequency droop control equation. Based on the voltage control mode output angular frequency $\omega_v$, voltage source mode output angle θ is acquired, θ=$\omega_v$/s, s being a Laplace operator.

The active-frequency droop control equation is defined as follows:

$$\omega=\omega_n+m(P_{set}-P_e)$$

where $P_{set}$ denotes an active command signal, m denotes an active-frequency droop coefficient, and $\omega_n$ denotes a rated angular frequency of a system.

In this embodiment, $P_{set}$=20 kW, and m=0.0001413.

Step 6.4, based on the voltage control mode output phase angle θ acquired in the step 6.3 and the three-phase voltages $u_{pcca}$, $u_{pccb}$, and $u_{pccc}$ of the filtering capacitor and the three-phase currents $i_{ga}$, $i_{gb}$, and $i_{gc}$ of the filtering inductor acquired in the step 1, a transformation from the three-phase static coordinate system to a two-phase rotating coordinate system is performed to acquire d- and q-axis voltages $u_{pccd2}$ and $u_{pccq2}$ of the filtering capacitor in the voltage control mode and d- and q-axis currents $i_{gd2}$ and $i_{gq2}$ of the filtering inductor in the voltage control mode.

Step 6.5, based on the instantaneous reactive power $Q_e$ acquired in the step 6.2, voltage command signals $u_{dref}$ and $u_{qref}$ in the voltage control mode are acquired according to reactive-voltage droop control equations.

The reactive-voltage droop control equations are as follows:

$$u_{dref}=\sqrt{2}V_n+n(Q_{set}-Q_e)$$

$$u_{qref}=0$$

where $V_n$ denotes an effective value of a grid phase voltage, $Q_{set}$ denotes a reactive command signal, and n denotes a reactive-voltage droop coefficient.

In this embodiment, $V_n$=220 V, $Q_{set}$=0 kW, and n=0.0010885.

Step 6.6, based on the d- and q-axis currents $i_{gd2}$ and $i_{gq2}$ of the filtering inductor in the voltage control mode and the d- and q-axis voltages $u_{pccd2}$ and $u_{pccq2}$ of the filtering capacitor in the voltage control mode acquired in the step 6.4 and the voltage command signals $u_{dref}$ and $u_{qref}$ in the voltage control mode acquired in the step 6.5, d- and q-axis control signals $u_{d2}$ and $u_{q2}$ in a voltage source mode are acquired according to voltage-current closed-loop control equations.

The voltage-current closed-loop control equations are as follows:

$$u_{d2} = \left(k_{p\_cc\_v} + \frac{k_{i\_cc\_v}}{s}\right)\left[\left(k_{p\_vc} + \frac{k_{i\_vc}}{s}\right)(u_{dref} - u_{pccd2}) - i_{gd2}\right]$$

$$u_{q2} = \left(k_{p\_cc\_v} + \frac{k_{i\_cc\_v}}{s}\right)\left[\left(k_{p\_vc} + \frac{k_{i\_vc}}{s}\right)(u_{qref} - u_{pccq2}) - i_{gq2}\right]$$

where $k_{p\_cc\_v}$ denotes a proportional coefficient of the current control PI controller in the voltage control mode, $k_{i\_cc\_v}$ denotes an integral coefficient of the current control PI controller in the voltage control mode, $k_{p\_vc}$ denotes a proportional coefficient of a voltage control PI controller in the voltage control mode, and $k_{i\_vc}$ denotes an integral coefficient of the voltage control PI controller in the voltage control mode.

In this embodiment, $k_{p\_vc}=0.5$, $k_{i\_vc}=120$, $k_{p\_cc\_v}=4$, and $k_{i\_cc\_v}=10$.

Step 6.7, based on the voltage source mode output angle θ acquired in the step 6.3 and the voltage source mode d- and q-axis control signals $u_{d2}$ and $u_{q2}$ acquired in the step 6.6, a transformation from the two-phase rotating coordinate system to the three-phase static coordinate system is performed to acquire three-phase control signals $u_{a2}$, $u_{b2}$, and $u_{c2}$ in the voltage source mode in the static coordinate system.

Step 6.8, based on the three-phase control signals $u_{a2}$, $u_{b2}$, and $u_{c2}$ in the voltage source mode in the static coordinate system acquired in the step 6.7, a SVPWM is performed to generate a switch signal for a power device of the grid-connected inverter. The power device of the three-phase full-bridge grid-connected inverter is controlled by a driving protection circuit to be turned on and off.

In this embodiment, in the step 7, the added-damping-based current control mode includes:

Step 7.1, based on the three-phase voltages $u_{pcca}$, $u_{pccb}$, and $u_{pccc}$ of the filtering capacitor sampled in the step 1, d- and q-axis voltages $u_{pccd3}$ and $u_{pccq3}$ of the filtering capacitor in the added-damping-based current control mode are acquired according to a transformation equation from a three-phase static coordinate system to a two-phase rotating coordinate system. Phase locking is performed by the phase-locked loop on $u_{pccq3}$ to acquire voltage phase angle $\theta_{PLL\_R}$ of the filtering capacitor in the added-damping-based current control mode.

A phase-locked calculation equation for the voltage phase angle $\theta_{PLL\_R}$ of the filtering capacitor in the added-damping-based current control mode is as follows:

$$\theta_{PLL\_R} = \frac{\omega_n - (k_{p\_PLL\_R} + k_{i\_PLL\_R}/s)u_{pccq3}}{s}$$

where $\omega_n$ denotes a rated angular frequency of a system, $k_{p\_PLL\_R}$ denotes a proportional control coefficient of a phase-locked loop PI controller in the added-damping-based current control mode, $k_{i\_PLL\_R}$ denotes an integral control coefficient of the phase-locked loop PI controller in the added-damping-based current control mode, and $\omega_n$ denotes the rated angular frequency of the system.

In this embodiment, $\omega_n=100\ \pi$, $K_{p\_PLL\_R}=0.2776$, and $K_{i\_PLL\_R}=11.9882$.

Step 7.2, based on the voltage phase angle $\theta_{PLL\_R}$ of the filtering capacitor in the added-damping-based current control mode acquired in the step 7.1, a transformation from the three-phase static coordinate system to the two-phase rotating coordinate system is performed to transform the three-phase currents $i_{ga}$, $i_{gb}$, and $i_{gc}$ of the filtering inductor into d- and q-axis currents $i_{gd3}$ and $i_{gq3}$ of the filtering inductor in the added-damping-based current control mode.

Step 7.3, based on the d- and q-axis voltages $u_{pccd3}$ and $u_{pccq3}$ of the filtering capacitor in the added-damping-based current control mode acquired in the step 7.1, added-damping-based d- and q-axis current command correction signals $\Delta i_{dref}$ and $\Delta i_{qref}$ are calculated as follows:

$$\Delta i_{dref} = G_{BPF}(s)R_v u_{pccd3}$$

$$\Delta i_{qref} = G_{BPF}(s)R_v u_{pccq3}$$

where $R_v$ denotes an added-damping-based resistance value, and $G_{BPF}(s)$ denotes a bandpass filter and is specifically expressed is defined as follows:

$$G_{BPF}(s) = \frac{\omega_{c2}}{S+\omega_{c2}} - \frac{\omega_{c1}}{s+\omega_{c1}}$$

where $\omega_{c1}$ denotes a left frequency point of a passband of the bandpass filter $G_{BPF}(s)$, and $\omega_{c2}$ denotes a right frequency point of the passband of the bandpass filter $G_{BPF}(S)$.

In this embodiment, $R_v=0.3\ \Omega$, $\omega_{c1}=30\ \pi$, and $\omega_{c2}=200\ \pi$.

Step 7.4, current command signals in the added-damping-based current control mode are defined as $i_{dref3}$ and $i_{qref3}$. Based on the d- and q-axis currents $i_{gd3}$ and $i_{gq3}$ of the filtering inductor in the added-damping-based current control mode acquired in the step 7.2 and the added-damping-based d- and q-axis current command correction signals $\Delta i_{dref}$ and $\Delta i_{qref}$ acquired in the step 7.3, d- and q-axis control signals $u_{d3}$ and $u_{q3}$ in the added-damping-based current control mode are acquired according to current closed-loop control equations in the added-damping-based current control mode.

The current closed-loop control equations in the added-damping-based current control mode are is defined as follows:

$$u_{d3} = \left(k_{p\_cc\_R} + \frac{k_{i\_cc\_R}}{s}\right)(i_{dref3} - i_{gd3} - \Delta i_{dref})$$

$$u_{q3} = \left(k_{p\_cc\_R} + \frac{k_{i\_cc\_R}}{s}\right)(i_{qref3} - i_{gq3} - \Delta i_{qref})$$

where $k_{p\_cc\_R}$ denotes a proportional coefficient of the current control PI controller in the added-damping-based current control mode, and $k_{i\_cc\_R}$ denotes an integral coefficient of the current control PI controller in the added-damping-based current control mode.

In this embodiment, $i_{dref3}=42$ A, $i_{qref}3=0$ A, $k_{p\_cc\_R}=4$, and $k_{i\_cc\_R}=10$.

Step 7.5, based on the voltage phase angle $\theta_{PLL\_R}$ of the filtering capacitor in the added-damping-based current control mode acquired in the step 7.1 and the d- and q-axis control signals $u_{d3}$ and $u_{q3}$ in the added-damping-based current control mode acquired in the step 7.4, a transformation from the two-phase rotating coordinate system to the three-phase static coordinate system is performed to acquire three-phase control signals $u_{a3}$, $u_{b3}$, and $u_{c3}$ in the added-damping-based current control mode in the static coordinate system.

Step 7.6, based on the three-phase control signals $u_{a3}$, $u_{b3}$, and $u_{c3}$ in the added-damping-based current control mode in the static coordinate system acquired in the step 7.5, a SVPWM is performed to generate a switch signal for a power device of the grid-connected inverter. The power device of the three-phase full-bridge grid-connected inverter is controlled by a driving protection circuit to be turned on and off.

In order to demonstrate the beneficial effects of the present disclosure, MATLAB/Simulink simulation was conducted.

Figure 3:
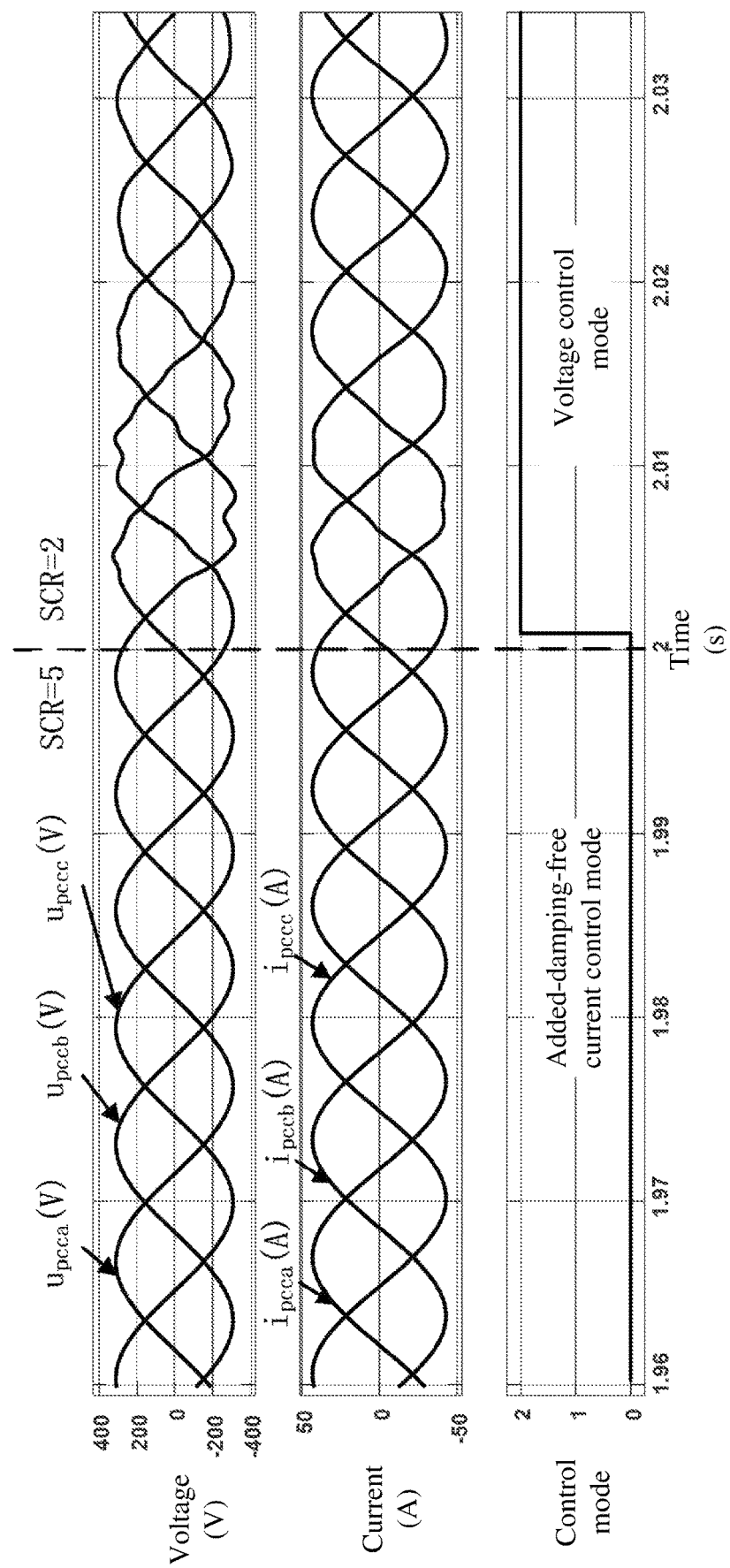
FIG. 3 shows waveforms of voltages and currents, as well as control modes of the grid-connected inverter when a SCR changes from 5 to 2 according to a method of the present disclosure.
Figure 4:
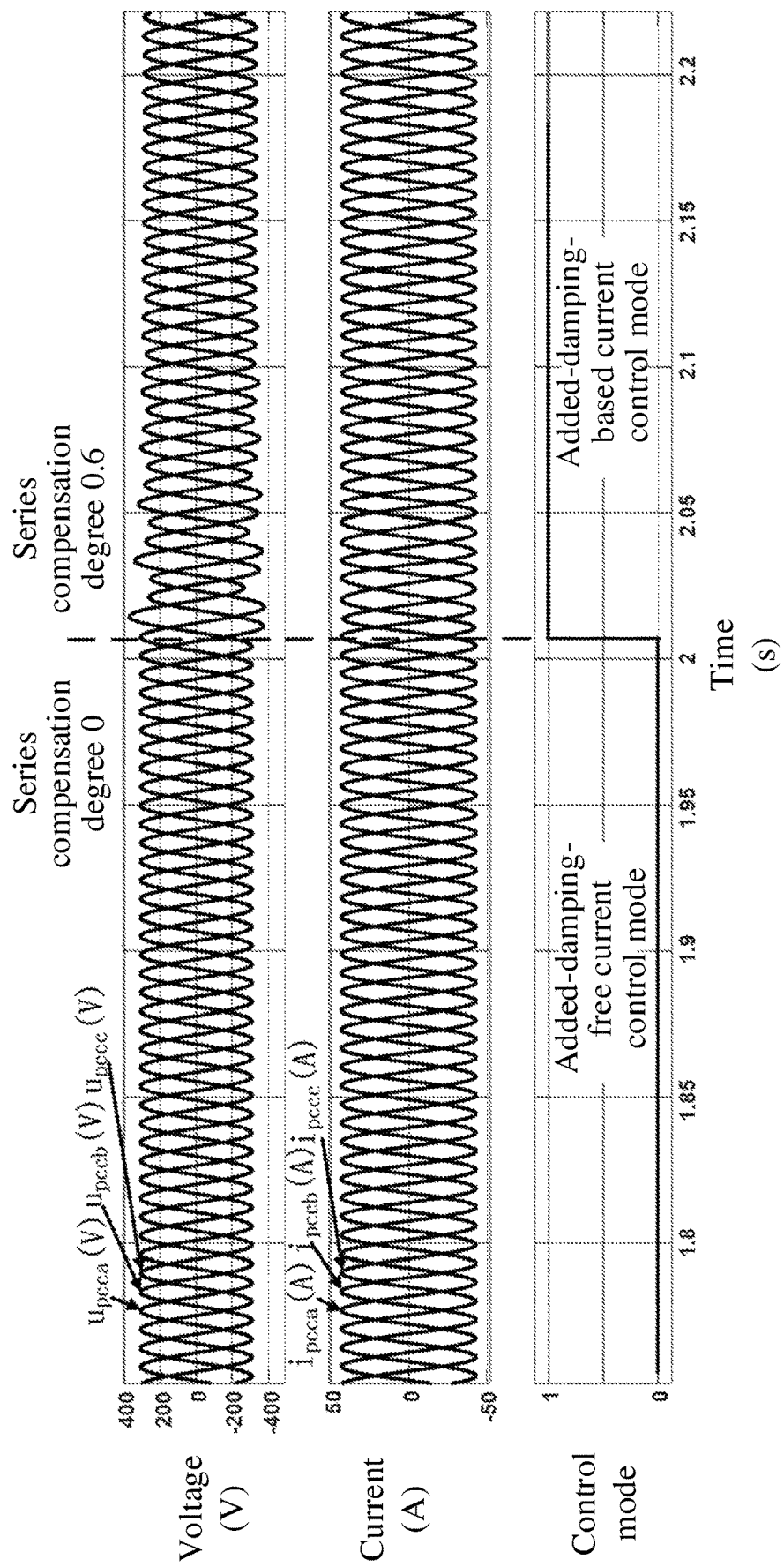
FIG. 4 shows waveforms of voltages and currents, as well as control modes of the grid-connected inverter when a system series compensation degree changes from 0 to 0.6 according to the method of the present disclosure.

FIG. 3 shows waveforms of the three-phase voltages $u_{pcca}$, $u_{pccb}$, and $u_{pccc}$ of the filtering capacitor and the three-phase currents $i_{ga}$, $i_{gb}$, and $i_{gc}$ of the filtering inductor, as well as control modes of the grid-connected inverter when the SCR changes from 5 to 2 according to the method of the present disclosure. FIG. 4 shows waveforms of the three-phase voltages $u_{pcca}$, $u_{pccb}$, and $u_{pccc}$ of the filtering capacitor and the three-phase currents $i_{ga}$, $i_{gb}$, and $i_{gc}$ of the filtering inductor, as well as control modes of the grid-connected inverter when the system series compensation degree changes from 0 to 0.6 according to the method of the present disclosure. In these two diagrams, the abscissa denotes time (in seconds), and the ordinate denotes voltage (V), current (A), and control mode, respectively.

As shown in FIG. 3, according to the method of the present disclosure, when the SCR changes from 5 to 2, the grid-connected inverter can switch from the added-damping-free current control mode to the voltage control mode, thereby achieving stable operation. As shown in FIG. 4, according to the method of the present disclosure, when the system series compensation degree changes from 0 to 0.6, the grid-connected inverter can switch from the added-damping-free current control mode to the added-damping-based current control mode, thereby achieving stable operation.

The invention claimed is:

1. A multi-mode control method for a grid-connected inverter, wherein a topology of the grid-connected inverter using the multi-mode control method comprises a direct current (DC) side power supply, a three-phase full-bridge inverter circuit, an LC filter, a grid impedor, and a three-phase power grid; the three-phase full-bridge inverter circuit, the LC filter, and the grid impedor are sequentially connected in series and then connected to the three-phase power grid; and the LC filter comprises a filtering inductor, a filtering capacitor, and a damping resistor; and the multi-mode control method comprises the following steps:

step 1, sampling three-phase voltages $u_{pcca}$, $u_{pccb}$, and $u_{pccc}$ of the filtering capacitor and three-phase currents $i_{ga}$, $i_{gb}$, and $i_{gc}$ of the filtering inductor;

step 2, allowing the grid-connected inverter to operate in an added-damping-free current control mode;

step 3, continuously calculating an effective value $V_{HarRms1}$ of a series compensation voltage harmonic of the filtering capacitor and an effective value $V_{HarRms2}$ of a weak grid voltage harmonic of the filtering capacitor;

step 4, initiating a system short-circuit ratio (SCR) estimation method as follows:

step 4.1, defining a switching boundary of a system SCR as $S_m$, and defining a limit for the effective value of the weak grid voltage harmonic of the filtering capacitor as $V_{Limit2}$; defining a proportional coefficient of a current control proportional-integral (PI) controller in the added-damping-free current control mode as $k_{p\_cc}$; and defining a switching boundary of the proportional coefficient of the current control PI controller in the added-damping-free current control mode as $k_{p\_cc\_m}$, wherein specifically, the proportional coefficient of the current control PI controller refers to a proportional coefficient that makes $V_{HarRms2}=V_{Limit2}$ when the system SCR=$S_m$;

step 4.2, defining an initial value of $k_{p\_cc}$ as $k_{p\_cc\_0}$, and continuously increasing $k_{p\_cc}$ to excite the voltage harmonic of the filtering capacitor; and stopping increasing $k_{p\_cc}$ when $V_{HarRms2}=V_{Limit2}$, and recording $k_{p\_cc}$ as a measured value $k_{p\_cc\_n}$ of the proportional coefficient of the current control PI controller in the added-damping-free current control mode;

step 4.3, determining that:
a current system SCR<$S_m$ when $k_{p\_cc\_n}$<$k_{p\_cc\_m}$;
the current system SCR=$S_m$ when $k_{p\_cc\_n}$=$k_{p\_cc\_m}$; and
the current system SCR>$S_m$ when $k_{p\_cc\_n}$>$k_{p\_cc\_m}$; and step 4.4, restoring the proportional coefficient $k_{p\_cc}$ of the current control PI controller in the added-damping-free current control mode to the initial value $k_{p\_cc\_0}$;

step 5, defining a system series compensation degree as $K_c$, and initiating a system series compensation degree $K_c$ estimation method as follows:

step 5.1, defining a switching boundary of the system series compensation degree as $C_m$; defining a limit for the effective value of the series compensation voltage harmonic of the filtering capacitor as $V_{Limit1}$, and defining a bandwidth of a phase-locked loop in the added-damping-free current control mode as $f_{bw\_PLL}$; and defining a switching boundary of the bandwidth of the phase-locked loop in the added-damping-free current control mode as $f_{bw\_PLL\_m}$, wherein the bandwidth of the phase-locked loop refers to a bandwidth that makes $V_{HarRms1}=V_{Limit1}$ when the system series compensation degree $K_c=C_m$;

step 5.2, defining an initial value of $f_{bw\_PLL}$ as $f_{bw\_PLL\_0}$, and continuously increasing $f_{bw\_PLL}$ to excite the voltage harmonic of the filtering capacitor; and stopping increasing $f_{bw\_PLL}$ when $V_{HarRms1}=V_{Limit1}$, and recording $f_{bw\_PLL}$ as a measured value $f_{bw\_PLL\_n}$ of the bandwidth of the phase-locked loop in the added-damping-free current control mode;

step 5.3, determining that:
a current system series compensation degree $K_c>C_m$ when $f_{bw\_PLL\_n}<f_{bw\_PLL\_m}$;
the current system series compensation degree Ke-$C_m$ when $f_{bw\_PLL\_n}=f_{bw\_PLL\_m}$; and
the current system series compensation degree $K_c<C_m$ when $f_{bw\_PLL\_n}>f_{bw\_PLL\_m}$; and step 5.4, restoring the bandwidth $f_{bw\_PLL}$ of the phase-locked loop in the added-damping-free current control mode to the initial value $f_{bw\_PLL\_0}$;

step 6, performing the following operations based on the system SCR:

when SCR≤$S_m$: switching the grid-connected inverter to a voltage control mode, and ending a present control process; and when SCR>$S_m$: proceeding to step 7; and step 7, performing the following operations based on the system series compensation degree $K_c$:

when $K_c>C_m$: switching the grid-connected inverter to an added-damping-based current control mode, and ending the present control process; and when $K_c \leq C_m$: maintaining the grid-connected inverter to operate in the added-damping-free current control mode, and ending the present control process.

2. The multi-mode control method for the grid-connected inverter according to claim 1, wherein in the step 2, the added-damping-free current control mode is implemented as follows:

step 2.1, performing, based on the three-phase voltages $u_{pcca}$, $u_{pccb}$, and $u_{pccc}$ of the filtering capacitor sampled in the step 1, a transformation from a three-phase static coordinate system to a two-phase rotating coordinate system to acquire d-axis and q-axis voltages $u_{pccd1}$ and $u_{pccq1}$ of the filtering capacitor in the added-damping-free current control mode; and performing, by the phase-locked loop, phase locking on $u_{pccq1}$ to acquire a voltage phase angle $\theta_{PLL}$ of the filtering capacitor in the added-damping-free current control mode according to the following phase-locked calculation equation:

$$\theta_{PLL} = \frac{\omega_n - (k_{p\_PPL} + k_{i\_PLL}/s)u_{pccq1}}{s}$$

wherein $\omega_n$ denotes a rated angular frequency of a system, $k_{p\_PLL}$ denotes a proportional control coefficient of a phase-locked loop PI controller in the added-damping-free current control mode, s denotes a Laplace operator and $k_{i\_PLL}$ denotes an integral control coefficient of the phase-locked loop PI controller in the added-damping-free current control mode;

step 2.2, transforming, based on the voltage phase angle $\theta_{PLL}$ of the filtering capacitor in the added-damping-free current control mode acquired in the step 2.1, the three-phase currents $i_{ga}$, $i_{gb}$, and $i_{gc}$ of the filtering inductor into d-axis and q-axis currents $i_{gd1}$ and $i_{gq1}$ of the filtering inductor in the added-damping-free current control mode according to a transformation equation from the three-phase static coordinate system to the two-phase rotating coordinate system;

step 2.3, defining current command signals in the added-damping-free current control mode as $i_{dref1}$ and $i_{qref1}$; and acquiring, based on the d-axis and q-axis currents $i_{gd1}$ and $i_{gq1}$ of the filtering inductor in the added-damping-free current control mode acquired in the step 2.2, d-axis and q-axis control signals $u_{d1}$ and $u_{q1}$ in the added-damping-free current control mode according to current closed-loop control equations in the added-damping-free current control mode;

wherein the current closed-loop control equations in the added-damping-free current control mode are as follows:

$$u_{d1} = \left(k_{p\_cc} + \frac{k_{i\_cc}}{s}\right)(i_{dref} - i_{gd1})$$

$$u_{q1} = \left(k_{p\_cc} + \frac{k_{i\_cc}}{s}\right)(i_{qref1} - i_{gq1})$$

wherein $k_{p\_cc}$ denotes the proportional coefficient of the current control PI controller in the added-damping-free current control mode, and $k_{i\_cc}$ denotes an integral coefficient of the current control PI controller in the added-damping-free current control mode;

step 2.4, performing, based on the voltage phase angle $\theta_{PLL}$ of the filtering capacitor in the added-damping-free current control mode acquired in the step 2.1 and the d-axis and q-axis control signals $u_{d1}$ and $u_{q1}$ in the added-damping-free current control mode acquired in the step 2.3, a transformation from the two-phase rotating coordinate system to the three-phase static coordinate system to acquire three-phase control signals $u_{a1}$, $u_{b1}$, and $u_{c1}$ in the added-damping-free current control mode in the three-phase static coordinate system; and step 2.5, performing, based on the three-phase control signals $u_{a1}$, $u_{b1}$, and $u_{c1}$ in the added-damping-free current control mode in the three-phase static coordinate system acquired in the step 2.4, a space vector pulse width modulation (SVPWM) to generate a switch signal for a power device of the grid-connected inverter; and controlling, by a driving protection circuit, the power device of the three-phase full-bridge grid-connected inverter to be turned on and off.

3. The multi-mode control method for the grid-connected inverter according to claim 1, wherein the step 3 comprises: presetting a harmonic effective value calculation interval $T_{onecycle}$, starting a round of harmonic effective value calculation when the harmonic effective value calculation interval $T_{onecycle}$ is reached, and calculating the effective value $V_{HarRms1}$ of the series compensation voltage harmonic of the filtering capacitor and the effective value $V_{HarRms2}$ of the weak grid voltage harmonic of the filtering capacitor;

step 3.1, processing, by a low-pass filter $G_L(s)$ and a bandpass filter $G_B(s)$, an A-phase voltage $u_{pcca}$ of the filtering capacitor to acquire an A-phase low-pass voltage $u_{pcca\_L}$ and an A-phase bandpass voltage $u_{pcca\_B}$ of the filtering capacitor;

wherein the A-phase voltage of the filtering capacitor is processed by the low-pass filter $G_L(s)$ and the bandpass filter $G_B(s)$ according to the following equations:

$$u_{pcca\_L} = G_L(s)u_{pcca} = \frac{1}{T_{filter}s}u_{pcca}$$

$$u_{pcca\_B} = G_B(s)u_{pcca} = \left(\frac{\omega_{B2}}{s+\omega_{B2}} - \frac{\omega_{B1}}{s+\omega_{B1}}\right)u_{pcca}$$

wherein $T_{filter}$ denotes a time constant of the low-pass filter, $\omega_{B2}$ denotes a right frequency point of the bandpass filter, $\omega_{B1}$ denotes a left frequency point of the bandpass filter, and s denotes a Laplace operator;

step 3.2, defining a sampling period of the grid-connected inverter as $T_s$, continuously recording the A-phase low-pass voltage $u_{pcca\_L}$ and the A-phase bandpass voltage $u_{pcca\_B}$ of the filtering capacitor acquired in the step 3.1 during each sampling period, defining a number of records within the harmonic effective value calculation interval $T_{onecycle}$ as N, $N=T_{onecycle}/T_s$, and defining the A-phase low-pass voltage $u_{pcca\_L}$ and the A-phase bandpass voltage $u_{pcca\_B}$ of the filtering capacitor at an i-th record as $u_{pcca\_L}(i)$ and $u_{pcca\_B}(i)$, respectively, wherein $i \geq 1$ and $i \leq N$; and step 3.3, calculating, based on the A-phase low-pass voltage and the A-phase bandpass voltage of the filtering capacitor recorded in the step 3.2, the effective value $V_{HarRms1}$ of the series compensation voltage harmonic of the filtering capacitor and the effective value $V_{HarRms2}$ of the weak grid voltage harmonic of the filtering capacitor as follows:

$$V_{HarRms1} = \sqrt{\frac{1}{N}\sum_{i=1}^{N}\{[u_{pcca\_L}(i)]^2\}}$$

$$V_{HarRms2} = \sqrt{\frac{1}{N}\sum_{i=1}^{N}\{[u_{pcca\_B}(i)]^2\}}.$$

4. The multi-mode control method for the grid-connected inverter according to claim 1, wherein in the step 6, the voltage control mode comprises:

step 6.1, acquiring, based on the three-phase voltages $u_{pcca}$, $u_{pccb}$, and $u_{pccc}$ of the filtering capacitor sampled in the step 1, α-axis and β-axis voltages $u_{pcc\alpha}$ and $u_{pcc\beta}$ of the filtering capacitor according to a transformation equation from a three-phase static coordinate system to a two-phase static coordinate system; and acquiring, based on the three-phase currents $i_{ga}$, $i_{gb}$, and $i_{gc}$ of the filtering inductor sampled in the step 1, α-axis and β-axis currents $i_{g\alpha}$ and $i_{g\beta}$ of the filtering inductor according to the transformation equation from the three-phase static coordinate system to the two-phase static coordinate system;

step 6.2, acquiring, based on the α-axis and β-axis voltages $u_{pcc\alpha}$ and $u_{pcc\beta}$ of the filtering capacitor and the α-axis and β-axis currents $i_{g\alpha}$ and $i_{g\beta}$ of the filtering inductor acquired in the step 6.1, an instantaneous active power $P_e$ and an instantaneous reactive power $Q_e$ according to instantaneous power calculation equations;

wherein the instantaneous power calculation equations are as follows:

$$P_e = 1.5(u_{pcc\alpha}i_{g\alpha} + u_{pcc\beta}i_{g\beta})$$

$$Q_e = 1.5(u_{pcc\alpha}i_{g\beta} - u_{pcc\beta}i_{g\alpha})$$

step 6.3, acquiring, based on the instantaneous active power $P_e$ acquired in the step 6.2, a voltage control mode output angular frequency $\omega_v$, according to an active-frequency droop control equation; and acquiring, based on the voltage control mode output angular frequency $\omega_v$, a voltage source mode output angle θ, $\theta=\omega_v/s$, s being a Laplace operator;

wherein the active-frequency droop control equation is as follows:

$$\omega_v = \omega_n + m(P_{set} - P_e)$$

wherein $P_{set}$ denotes an active command signal, m denotes an active-frequency droop coefficient, and on denotes a rated angular frequency of a system;

step 6.4, performing, based on the voltage control mode output phase angle θ acquired in the step 6.3 and the three-phase voltages $u_{pcca}$, $u_{pccb}$, and $u_{pccc}$ of the filtering capacitor and the three-phase currents $i_{ga}$, $i_{gb}$, and $i_{gc}$ of the filtering inductor acquired in the step 1, a transformation from the three-phase static coordinate system to a two-phase rotating coordinate system to acquire d-axis and q-axis voltages $u_{pccd2}$ and $u_{pccq2}$ of the filtering capacitor in the voltage control mode and d-axis and q-axis currents $i_{gd2}$ and $i_{gq2}$ of the filtering inductor in the voltage control mode;

step 6.5, acquiring, based on the instantaneous reactive power $Q_e$ acquired in the step 6.2, voltage command signals $u_{dref}$ and $u_{qref}$ in the voltage control mode according to reactive-voltage droop control equations; wherein the reactive-voltage droop control equations are as follows:

$$u_{dref} = \sqrt{2}V_n + n(Q_{set} - Q_e)$$

$$u_{qref} = 0$$

wherein $V_n$ denotes an effective value of a grid phase voltage, $Q_{set}$ denotes a reactive command signal, and n denotes a reactive-voltage droop coefficient;

step 6.6, acquiring, based on the d-axis and q-axis currents $i_{gd2}$ and $i_{gq2}$ of the filtering inductor in the voltage control mode and the d-axis and q-axis voltages $u_{pccd2}$ and $u_{pccq2}$ of the filtering capacitor in the voltage control mode acquired in the step 6.4 and the voltage command signals $u_{dref}$ and $u_{qref}$ in the voltage control mode acquired in the step 6.5, d-axis and q-axis control signals $u_{d2}$ and $u_{q2}$ in a voltage source mode according to voltage-current closed-loop control equations;

wherein the voltage-current closed-loop control equations are as follows:

$$u_{d2} = \left(k_{p\_cc\_v} + \frac{k_{i\_cc\_v}}{s}\right)\left[\left(k_{p\_ve} + \frac{k_{i\_vc}}{s}\right)(u_{dref} - u_{pccd2}) - i_{pd2}\right]$$

$$u_{q2} = \left(k_{p\_cc\_v} + \frac{k_{i\_cc\_v}}{s}\right)\left[\left(k_{p\_vc} + \frac{k_{i\_vs}}{s}\right)(u_{qref} - u_{pccq2}) - i_{gq2}\right]$$

wherein $k_{p\_cc\_v}$ denotes a proportional coefficient of the current control PI controller in the voltage control mode, $k_{i\_cc\_v}$ denotes an integral coefficient of the current control PI controller in the voltage control mode, $k_{p\_vc}$ denotes a proportional coefficient of a voltage control PI controller in the voltage control mode, and $k_{i\_vc}$ denotes an integral coefficient of the voltage control PI controller in the voltage control mode;

step 6.7, performing, based on the voltage source mode output angle θ acquired in the step 6.3 and the voltage source mode d-axis and q-axis control signals $u_{d2}$ and $u_{q2}$ acquired in the step 6.6, a transformation from the two-phase rotating coordinate system to the three-phase static coordinate system to acquire three-phase control signals $u_{a2}$, $u_{b2}$, and $u_{c2}$ in the voltage source mode in the three-phase static coordinate system; and step 6.8, performing, based on the three-phase control signals $u_{a2}$, $u_{b2}$, and $u_{c2}$ in the voltage source mode in the three-phase static coordinate system acquired in the step 6.7, a SVPWM to generate a switch signal for a power device of the grid-connected inverter; and controlling, by a driving protection circuit, the power device of the three-phase full-bridge grid-connected inverter to be turned on and off.

5. The multi-mode control method for the grid-connected inverter according to claim 1, wherein in the step 7, the added-damping-based current control mode comprises:

step 7.1, acquiring, based on the three-phase voltages $u_{pcca}$, $u_{pccb}$, and $u_{pccc}$ of the filtering capacitor sampled in the step 1, d-axis and q-axis voltages $u_{pccd3}$ and $u_{pccq3}$ of the filtering capacitor in the added-damping-based current control mode according to a transformation equation from a three-phase static coordinate system to a two-phase rotating coordinate system; and performing, by the phase-locked loop, phase locking on $u_{pccq3}$ to acquire a voltage phase angle $\theta_{PLL\_R}$ of the filtering capacitor in the added-damping-based current control mode;

wherein a phase-locked calculation equation for the voltage phase angle $\theta_{PLL\_R}$ of the filtering capacitor in the added-damping-based current control mode is as follows:

$$\theta_{PLL\_R} = \frac{\omega_n - (k_{p\_PLL\_R} + k_{i\_PLL\_R}/s)u_{pccq3}}{s}$$

wherein $\omega_n$ denotes a rated angular frequency of a system, $k_{p\_PLL\_R}$ denotes a proportional control coefficient of a phase-locked loop PI controller in the added-damping-based current control mode, s denotes a Laplace operator and $k_{i\_PLL\_R}$ denotes an integral control coefficient of the phase-locked loop PI controller in the added-damping-based current control mode;

step 7.2, performing, based on the voltage phase angle $\theta_{PLL\_R}$ of the filtering capacitor in the added-damping-based current control mode acquired in the step 7.1, a transformation from the three-phase static coordinate system to the two-phase rotating coordinate system to transform the three-phase currents $i_{ga}$, $i_{gb}$, and $i_{gc}$ of the filtering inductor into d-axis and q-axis currents $i_{gd3}$ and $i_{gq3}$ of the filtering inductor in the added-damping-based current control mode;

step 7.3, calculating, based on the d-axis and q-axis voltages $u_{pccd3}$ and $u_{pccq3}$ of the filtering capacitor in the added-damping-based current control mode acquired in the step 7.1, added-damping-based d-axis and q-axis current command correction signals $\Delta i_{dref}$ and $\Delta i_{qref}$ as follows:

$$\Delta i_{dref} = G_{BPF}(s)R_v u_{pccd3}$$

$$\Delta i_{qref} = G_{BPF}(s)R_v u_{pccq3}$$

wherein $R_v$ denotes an added-damping-based resistance value; and $G_{BPF}(s)$ denotes a bandpass filter and is expressed as follows:

$$G_{BPP}(s) = \frac{\omega_{c2}}{s+\omega_{c2}} - \frac{\omega_{c1}}{s+\omega_{c1}}$$

wherein $\omega_{c1}$ denotes a left frequency point of a passband of the bandpass filter $G_{BPF}(S)$, and $\omega_{c2}$ denotes a right frequency point of the passband of the bandpass filter $G_{BPF}(S)$;

step 7.4, defining current command signals in the added-damping-based current control mode as $i_{dref3}$ and $i_{qref3}$; and acquiring, based on the d-axis and q-axis currents $i_{gd3}$ and $i_{gq3}$ of the filtering inductor in the added-damping-based current control mode acquired in the step 7.2 and the added-damping-based d-axis and q-axis current command correction signals $\Delta i_{dref}$ and $\Delta i_{qref}$ acquired in the step 7.3, d-axis and q-axis control signals $u_{d3}$ and $u_{q3}$ in the added-damping-based current control mode according to current closed-loop control equations in the added-damping-based current control mode;

wherein the current closed-loop control equations in the added-damping-based current control mode are as follows:

$$u_{d3} = \left(k_{p\_cc\_R} + \frac{k_{i\_cc\_R}}{s}\right)(i_{dref3} - i_{gd3} - \Delta i_{dref})$$

$$u_{q3} = \left(k_{p\_cc\_R} + \frac{k_{i\_cc\_R}}{s}\right)(i_{qref} - i_{gq3} - \Delta i_{qref})$$

wherein $k_{p\_cc\_R}$ denotes a proportional coefficient of the current control PI controller in the added-damping-based current control mode, and $k_{i\_cc\_R}$ denotes an integral coefficient of the current control PI controller in the added-damping-based current control mode;

step 7.5, performing, based on the voltage phase angle $\theta_{PLL\_R}$ of the filtering capacitor in the added-damping-based current control mode acquired in the step 7.1 and the d-axis and q-axis control signals $u_{d3}$ and $u_{q3}$ in the added-damping-based current control mode acquired in the step 7.4, a transformation from the two-phase rotating coordinate system to the three-phase static coordinate system to acquire three-phase control signals $u_{a3}$, $u_{b3}$, and $u_{c3}$ in the added-damping-based current control mode in the three-phase static coordinate system; and step 7.6, performing, based on the three-phase control signals $u_{a3}$, $u_{b3}$, and $u_{c3}$ in the added-damping-based current control mode in the three-phase static coordinate system acquired in the step 7.5, a SVPWM to generate a switch signal for a power device of the grid-connected inverter; and controlling, by a driving protection circuit, the power device of the three-phase full-bridge grid-connected inverter to be turned on and off.

* * * * *